Dec. 22, 1942.    B. ANDERSEN ET AL    2,305,658
FILMS
Filed July 8, 1940
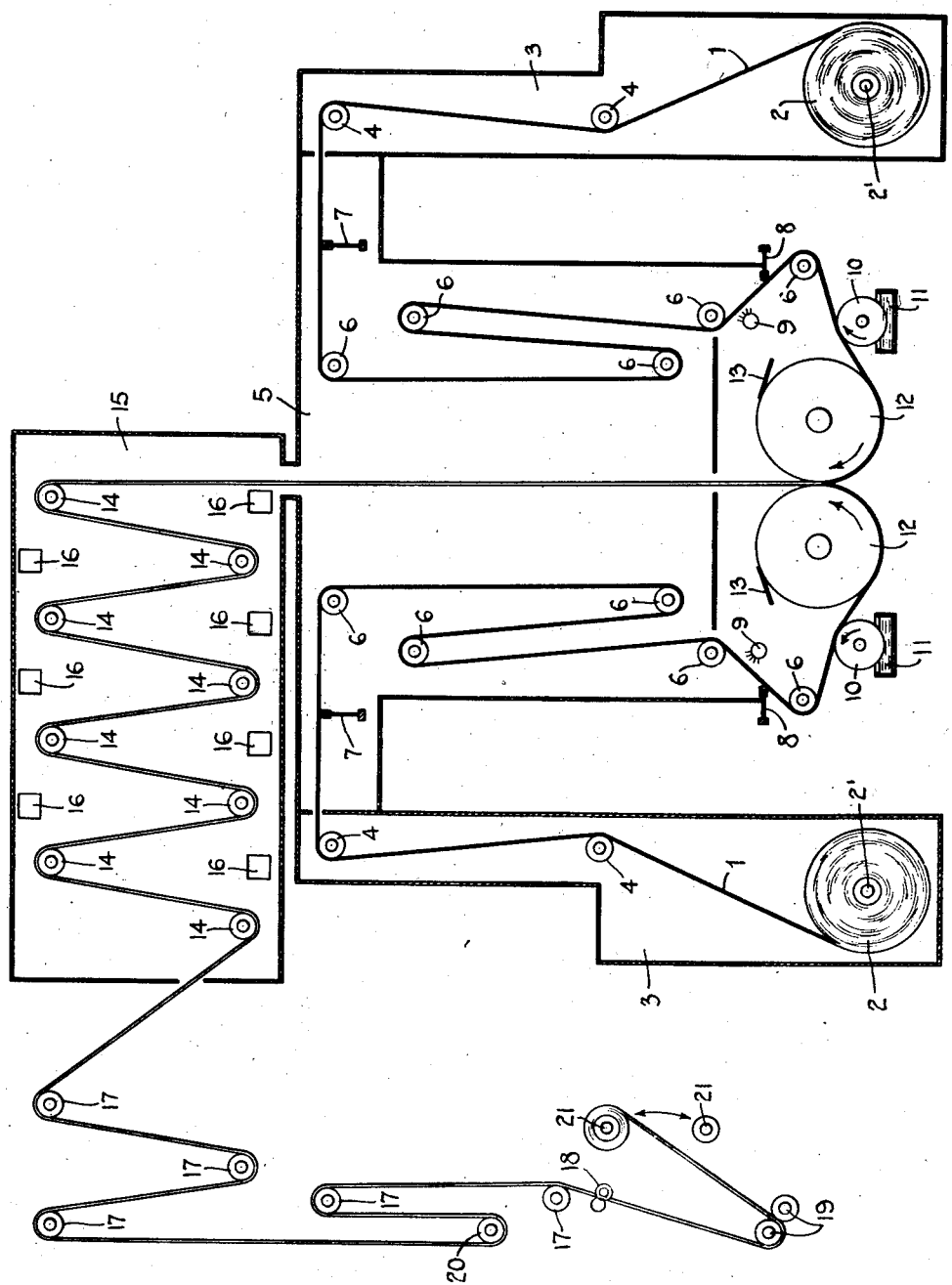
INVENTORS
BJORN ANDERSEN
RALPH H. BALL
BY
ATTORNEYS Patented Dec. 22, 1942

2,305,658

UNITED STATES PATENT OFFICE 2,305,658

FILMS

Bjorn Andersen, Maplewood, and Ralph H. Ball, Cranford, N. J., assignors, by mesne assignments, to Celanese Corporation of America, a corporation of Delaware Application July 8, 1940, Serial No. 344,350

7 Claims. (Cl. 18—59)

This invention relates to the lamination of films of thermoplastic materials and relates more particularly to the lamination of films of cellulose derivatives.

An object of this invention is the lamination of films of cellulose derivatives to produce a film of heavier gauge and improved appearance.

Another object of this invention is the production of a laminated cellulose derivative film which will possess high tear strength and low shrinkage, will be non-warping and which will remain permanently flat.

Another object of this invention is the lamination of cellulose derivative films so that the resulting heavier gauge film will be of a unitary structure with complete coalescence at the interfacial bond.

Still another object of this invention is the development of a device or means by which the lamination of one or more films as above outlined may be carried out in a rapid and economical manner.

Other objects of this invention will appear hereinafter from the following detailed description.

Heavy sheets or films of cellulose derivatives are frequently desired for many industrial purposes. Various methods have been used in attempting to produce heavy sheets or films of cellulose derivatives which are clear, transparent, permanently flat and possess a desirable degree of flexibility. One method employed was to cast heavy films on casting wheels by the usual technique employed for casting thin films, but the extreme slowness with which this process must be carried out makes it quite uneconomic apart from the fact that imperfect films are obtained. Attempts have also been made to planer-cut sheets from solid blocks and mandrels of a derivative of cellulose or to extrude such sheets, but sheets prepared in this manner are not very desirable since they are frequently marred by knife lines and extrusion drag marks and show other processing faults. In addition to these methods, it has been attempted to produce a heavy cellulose derivative film or sheet by laminating two films of lighter gauge together with the aid of volatile solvents such as acetone, ethyl acetate, ethyl lactate, etc. This process, however, is highly objectionable in that it requires thorough and prolonged seasoning of the laminated film to permit the volatile solvent to diffuse through the stock and to escape from the product by evaporation. If the volatile solvents are not permitted to escape by seasoning the material for prolonged periods of time, the resulting laminated structure will subsequently shrink or warp out of shape. In addition, the use of volatile solvents leads to many other manufacturing and processing difficulties such as the presence of uncoated or dry spots, cockles, excessive shrinkage, residual solvent odor, etc.

We have now discovered a process whereby cellulose derivative films may be laminated and the above, inherent disadvantages of the prior art planer and mandrel cutting, extrusion and lamination processes may be overcome. In accordance with our invention cellulose derivative films may be laminated by preheating the films to be joined, coating a surface of each of the films with a relatively non-volatile plasticizer maintained at an elevated temperature, joining the coated surfaces by subjecting them to heat and pressure and after the two films have been joined, the unitary structure is passed through a heated chamber to anneal the film insuring complete adhesion and coalescence and to permit the partial diffusion of the relatively non-volatile cementing or binding agent into the body of the film. After the film which has been laminated in this manner has cooled, it is ready for immediate use inasmuch as it will undergo no subsequent shrinkage or warping in service. In addition, these comparatively heavy films are free of flow lines, cockles, skips, wrinkles, or other irregularities, and possess an unexpectedly high degree or tear strength and permanent flatness. Moreover, our novel process for the lamination of cellulose derivative films not only produces films possessing these unusual properties but permits their production at relatively high operating speeds with a consequent economy of time and labor.

An illustrative method by which these laminated films of cellulose derivatives may be produced may be more fully illustrated and described in detail by reference to the accompanying drawing in which the figure is a diagrammatic showing of an apparatus suitable for carrying out the invention.

In the drawing, the individual films which are to be laminated together are carried in large rolls 2 which are supported on shafts 2'. The film is drawn from the rolls 2 and passes upwardly in the enclosed heated chamber 3 being guided in passing through the chamber by guide rollers 4. The films are then drawn into the preheating chamber 5 where they are preheated by being carried on an extended and tortuous path through the chamber 5 over guide rollers 6. As the moving films enter the heated chamber 5 the surfaces to be laminated and upon which the cementing agent is to be applied are passed in contact with velvet covered sponge rubber wiper bars 7 for removing dust and particles of dirt from the surfaces. At the lower end of the preheating chamber another sponge rubber wiper bar 8 is provided which removes any additional dust and dirt which may have gathered on the surfaces to be laminated during the passage of the film through the preheating chamber. A static eliminator 9 is installed close to and in front of the wiper bar 8 to carry away any static electricity charges which may have been generated by the movement of the film and thus make more complete the removal of all dust and dirt particles by the final wiper 8. If desired an additional static eliminator may be installed in close proximity to each of those shown but facing the other side of the film.

The hot cement or compositing plasticizer is applied to the surfaces of the film which are to be joined by means of coating rolls 10 which are rotated in a direction opposite to the direction of movement of the film. The coating rollers 10 are so arranged and constructed that their lower portions dip into the cement in heated supply troughs 11, the rollers being adjusted so that they pick up the desired amount of cement. By means of a heating medium circulating through the jacket (not shown) the cement is heated to a temperature high enough for it to attack the film stock so that a proper degree of adhesion will be obtained when the coated films are brought together. Hot water under pressure may be employed as a suitable heating medium but of course any other medium may be used depending upon how high a temperature is desired. Preferably, the coating rollers 10 rotate in contact with the moving film so that the cement is substantially completely removed from the roller by the film as the latter moves over the roller in the opposite direction. By supplying the cement in this manner a predetermined and controlled amount of cement may be applied to the surface of the film. The coating rollers may be driven by any suitable means but are preferably driven by an electric motor. By the use of suitable belts and pulleys the speed of the coating rollers may be varied as desired, depending on the rate of travel of the film.

After the hot cement is applied to the moving films the coated surfaces are brought together and subjected to the pressure of a pair of heated laminating drums 12. The laminating drums 12 are accurately ground, chilled iron cylinders which are mounted in heavy bearings and driven by a variable speed drive. The drums, one or both of which may also be made of materials other than iron, are heated by a circulating heating medium and the combined effect of the heat and pressure serves to laminate the coated films together to form a completely coalesced and indissoluble bond between the original separate films. The laminating drums are kept free of dirt, scale, excess cementing agent, etc., by means of scrapers 13 which may be adjusted to any desired position and pressure.

To properly diffuse the cementing agent or compositing plasticizer in the composite film structure and to anneal the latter, the laminated film is passed upward through the heated chamber 5 and is then festooned or carried in an extended and tortuous path over rollers 14 through another heated chamber 15. Heated air is supplied to the annealing chamber 15 through ducts 16 located at various strategic points in the chamber. The air is introduced by a blower (not shown) and the temperature of the heated air may be controlled as desired by the usual air heating means. The heated air not only heats the annealing chamber 15 but passes downward and by suitable ducts (not shown) is directed against and heats the film in the preheating chamber 5. The heated air which is not lost through the preheater, the exit slot, and other openings, is recirculated by being removed through another duct (not shown), reheated, and again sent to the heating chamber by the blower.

After the laminated film has been sufficiently annealed it is led from the heated chamber 15 and is air-cooled to as nearly room temperature as possible by being passed over rollers 17 out in the open. The laminated film is trimmed by cutting knives 18. The film is drawn from the heating chamber 15 and over rollers 17 by rubber pinch rolls 19, the speed of rotation of which is controlled by the floating roll 20. The finished film is spooled on spools 21, the double spools permitting the rolls of film to be cut at any desired length and a new spool started with a minimum expenditure of time and labor.

The laminating machine may be practically entirely enclosed except for the laminating drums, the coating rolls, and the cooling, cutting and winding portion as shown in the drawing. It will be understood of course that these portions may also be enclosed with doors, sliding panels, etc., constructed so as to afford easy access to the various parts. There may also be provided positively-cooled air for cooling the laminated film as well as duplicate unwinding shafts for carrying the film to be laminated so that the process may be made to operate continuously.

The films of cellulose derivatives which may be laminated according to our invention are films made of such derivatives as cellulose nitrate, organic esters and organic ethers of cellulose and films made of mixtures of these derivatives in varying proportions. Among the suitable organic esters of cellulose which may be employed are cellulose acetate, cellulose propionate, cellulose butyrate and such mixed esters as cellulose acetate-propionate, cellulose acetate-butyrate. Suitable ethers are ethyl cellulose, methyl cellulose and benzyl cellulose. While it is usual to laminate two similar derivatives of cellulose together, two different derivatives may be laminated where desired. Thus where it is desired to improve the water resistant properties of a film, such as one of cellulose acetate, a foil of ethyl cellulose may be laminated to a film of cellulose acetate and the resulting composite film will have the desirable properties of each cellulose derivative depending on the surface exposed. Mandrel-cut rolls in continuous lengths, such as wood-heel stock, can be satisfactorily laminated on both sides with cast film or foil of suitable thickness to obliterate the objectionable knife-lines characteristic of mandrel-made material.

Likewise, various other novel effects may be achieved by laminating other sheet materials between the two layers of cellulose derivative film such as fabric, paper, films made from a base of synthetic resin, such as polymerized vinyl or acrylic acid ester resin, etc. and wire screening. To facilitate perfect bonding or adhesion, the other sheet materials may also be coated or treated with the bonding or cementing material which may contain some dissolved resins such as polymerized vinyl acetate. Fabrics made of an organic derivative of cellulose laminated between the films may be used to give decorative effects which are a substantive part of the resulting laminated sheet. Using other materials, such as cotton cloth, cotton mesh or even metal or wire cloth or mesh, will result in a product which is strong and which may be put to a variety of uses. The plasticizer-softened surfaces of the cellulose derivatives readily anchor themselves under heat and pressure to the foraminous material by interstitial penetration and coalescence. The cellulose derivative films may carry printed designs or ornamentations which are resistant to any "running" or smearing action of the hot cementive plasticizer.

The bonding, cementing or compositing agents which may be used for the lamination of cellulose derivative films in accordance with our invention are those relatively non-volatile plasticizers for cellulose derivatives which preferably do not attack, or act as solvents for these cellulose derivatives at ordinary temperatures but which are active solvents for the cellulose derivatives at elevated temperatures. When these compounds are applied at elevated temperatures to be heated films they attack and penetrate the surface of the films and when the coated surface are brought together the two separate films will be fused to form a single unitary, solid, structure. Examples of such bonding and compositing plasticizers which have the above-enumerated properties and with which laminated films may be made in accordance with our invention are dimethyl phthalate, diethyl phthalate, tricresyl phosphate, dibutyl tartrate, dimethoxy ethyl phthalate, ethyl phthallyl ethyl glycollate, triethylene glycol and triacetin. These compositing plasticizers may be used alone or they may be mixed with each other or other relatively nonvolatile compositing plasticizers. The choice of a compositing plasticizer or plasticizer mixture depends on the conditions of operation, viz., the speed at which the film is being laminated, the various temperatures of operation, and the composition and thickness of the films which are being laminated.

The manner in which these compositing or cementing plasticizers are applied to the film is an important factor in the production of laminated films which are free of defects. The inclusion of particles of dust, dirt and other foreign matter between the laminated layers will result in an uneven surface, the individual particles showing up to the eye as upraised points wherever they have been trapped between the layers. While all possible dust, dirt and foreign matter is removed from the surfaces to be laminated by the velvet covered wiper bars, as shown, their action is often insufficient for the complete removal of all the minute particles of dust and dirt. We have discovered that these particles may be wholly removed by applying the compositing plasticizer to the moving films in slight excess so that the excess exerts a washing action when forced out at the nip of the laminating drums. This backwash or excess cement forced out at the nip of the laminating drums carries the foreign matter with it and is caught in pans (not shown) set beneath the laminating drums. This excess may of course be reused after proper purification. The temperature of the compositing plasticizer or cement as it is applied to the moving films will vary with the cement and also according to the thickness and composition of the film being laminated. A heavier film requires a greater amount of softening and consequently the cement should be applied at a higher temperature. Temperatures of from about 125° F. to about 220° F. are suitable. The cement is heated to these temperatures by varying the temperature of the circulating heating medium employed to heat the cement-holding trough below the coating rolls.

The preheater temperatures are not always the same but vary depending on the gauge and composition of the particular films which are being laminated. This of course is also true of the temperatures at which the annealing chamber is maintained. For the proper preheating of the cellulose derivative film compositions to be laminated the preheater chamber may generally be maintained at temperatures of from about 150° F. to about 210° F. The annealing chamber is preferably maintained at temperatures slightly higher than this and this preferable temperature differential may be about 5° F. to 20° F. The purpose of the annealing chamber is to insure a proper degree of diffusion of the compositing plasticizer through the laminated structure and the higher temperatures of the annealing chamber aid in accomplishing this result. While the compositing plasticizer is diffused through the laminated structure by annealing, the diffusion is insufficient to disperse the compositing plasticizer uniformly throughout the structure. The character of the final laminated film is such that the interfacial bond forms a zone of solid gel structure but of higher plasticizer concentration as compared to the outer portions of the film. The degree of heat to which the laminated structure may be subjected in the annealing chamber is restricted by the fact that if the temperature is too high, roller impressions will be made on the film in its passage through the heated annealing chamber. For this reason temperatures higher than about 235° F. in the annealing chamber are usually avoided since they are liable to produce laminated films of poor surface finish. While the temperature of the annealing chamber is an important factor, the degree of diffusion will of course depend upon the length of time during which the laminated film is exposed to this heat. For desirable results and a proper degree of diffusion the laminated film should generally remain in the annealing chamber for about from 1 to about 10 minutes as it passes from roller to roller.

The laminating drums should be heated to insure keeping the coated films at a proper temperature so that the compositing plasticizer will continue to exert a solvent effect and produce a completely coalesced film when the coated, partially dissolved or plasticized surfaces are forced together by the pressure of the drums. The temperature at which the drums are maintained will vary with the particular cellulose derivative being laminated, its thickness, and the compositing plasticizer being used. The heavier the gauge of the film the higher the temperatures needed to obtain the proper softening effect for a completely unified laminated film structure. The temperatures at which the laminating drums are operated may vary from about 140° F. to about 200° F. The drums may of course be operated at temperatures up to about 220° F. but the higher temperatures are limited by the fact that the films may be softened unduly and the uniformity of the film surfaces will be impaired.

The momentary, line contact pressure of the laminating drums on the films as they are laminated must be controlled in order to obtain a desirable product with intimate contact. The drums may be operated under conditions by which the drums are maintained at a fixed clearance which is less than the sum of the thicknesses of the films being laminated, but the preferable method of operation is at constant pressure so that for all thicknesses of films the pressure applied may be controllably varied. By a system of weights and levers the pressure may be kept uniform and if it is desired to increase or decrease the pressure during the course of a laminating run or where different thicknesses of film are being processed at different times this may be done by simple adjustments of the weights and levers. The lamination of heavier films requires the use of greater pressures for a proper degree of coalescence while in laminating lighter films less pressure may be used.

The thicknesses of laminated films which may be produced by our lamination process may vary from about .002 inch up to as high as .040 inch. While laminated films having only a single cement bond have been mentioned, films may also be made by this process wherein several thicknesses of film are laminated. Thus, films .01 inch thick may be made by compositing two films of .005 inch each and in turn the laminated .01 inch film may be laminated with another .01 inch laminated film to give a .02 inch film. The .02 inch film may be laminated with another similarly prepared .02 inch film to give films of .04 inch in thickness. Thus, it is apparent that a variety of thicknesses of film may be used in combination to obtain a final laminated film of any desired thickness. Not only may films of different gauge be laminated together but as has been indicated previously, different derivatives of cellulose may be laminated together as well as films of different formulae containing the same cellulose derivative but containing different plasticizers incorporated in the cast film particularly when variation in the degree of hardness or plasticity of the component layers is desired. Also films of materials other than cellulose derivatives may be laminated in this manner such as those made from synthetic resins, i. e., polymerized vinyl acetate, polymerized methyl methacrylate, polymerized styrol, etc. An important feature of the present invention is the fact that it enables the tendency of cast films to curl to be overcome and their resistance to tear to be increased.

The original film used for lamination is preferably prepared by the known technique of casting the films on film casting wheels. Thus, each film has what may be termed the wheel side, or side which was in contact with the wheel surface when made, and an air side or side which was away from the wheel when the film was cast. Ordinarily, when film is cast in this way it tends to curl in the direction of the wheel side and this tendency is accentuated when the film is exposed to heat and high humidity. The present invention makes it possible to counteract this tendency by suitably arranging the films to be laminated. This may be done by laminating the films so that the resulting bond is between the wheel-to-wheel sides or, less preferably, between the air-to-air sides. While laminations with the wheel-side to the air-side may also be made the results are not as satisfactory. As stated above the films are preferably laminated with the wheel-to-wheel surfaces forming the bond. By laminating the wheel-to-wheel surface, a laminated film is obtained having a tear resistance strength greater than films laminated in any other manner and also with little or no tendency to curl.

The speed at which films may be laminated in accordance with our process varies depending upon the thickness of films which are being laminated. For heavier films the speed is generally slower, since the thicker film must be softened and a greater time must be allowed for preheating as well as for the final annealing of the laminated film itself. For lighter films the speed at which they may be laminated may be as high as 30 feet per minute, while for heavier films the laminated films may be produced at up to about 20 feet per minute. In casting films of about .01 inch in thickness the casting speed is only about 1¼ to 1½ feet per minute but by the lamination process of our invention film of this thickness may be produced at the rate of about 20 to 25 feet per minute or 1200 to 1500 feet per hour.

In addition, film to be laminated may be produced at a rate far higher than film which is to be used singly. Thus, in casting .005 inch film for lamination the film may be cast at about 250 feet per hour while to produce a satisfactory .005 inch film to be used alone, the speed must be reduced to 150 feet per hour. Thus, .005 inch film for lamination may be produced at 250 feet per hour and may in turn be laminated at 1200 to 1500 feet per hour while the casting of .01 inch film may only be carried out at about 75 to 85 feet per hour.

In order further to illustrate our invention but without being limited thereto the following example is given.

Example

Films of cellulose acetate of about .005 inch in thickness are prepared by casting a solution of 95 parts of cellulose acetate, 5 parts of cellulose nitrate and 30 parts of triphenyl phosphate by weight in a sufficient amount of a solvent composed of 80% of acetone and 20% of ethyl alcohol to form a dope of sufficiently low viscosity for film casting. After the film has been cast and dried it is spooled and is then ready for lamination.

Two spools of this film are placed on the shafts 2' of the laminating apparatus and the wheel sides of the films are brought in contact as they are threaded through the preheater, between the laminating drums, through the annealing chamber, and around to where they are caught between the rubber pinch rolls 19. The laminating drums are adjusted with the clearance between them less than the thicknesses of the films being laminated so that sufficient pressure is exerted to composite the films. Hot water is circulated through the laminating drums to maintain them at about 175° F. and heated air is forced through the annealing chamber and preheater. The preheater is maintained at about 175° F. and the annealing chamber at about 185° F. The compositing plasticizer or cement, dimethyl phthalate, is heated to 165° F. in the troughs 11. The motor drives turning the laminating drums, the rubber pinch rolls and the coating rolls are started, and the films are set in motion. The coating rolls are set about 1.5 feet from the nip of the laminating drums to permit a sufficient interval of time for the hot cement to attack the surface of the films before being subjected to the nip of the laminating rolls and the coating rolls are revolved at about 10 R. P. M. to supply sufficient cement to form a p er bond and to also give the proper washing and runback action for complete removal of all dust particles which may have escaped the wiper bars.

The speed of the laminating drums is so controlled that the films are laminated at about 25 feet per minute. For drums of 10 inch diameter this will mean the drums turn at about 9 R. P. M. The laminated film is then passed to the annealing chamber where it is maintained at a temperature of about 185° F. for 3 minutes. In order to obtain this annealing effect for the desired period, the path of the laminated film through the annealing chamber is so arranged that about 75 feet of laminated film are present therein at all times. The hot film is then air-cooled by allowing it to move in the open over rollers. An exposed length of 40 feet of film between the annealing chamber exit and the wind-up rolls is sufficient for cooling. The laminated film is then spooled after the edges are trimmed by the cutters 18 and may be cut at any desired length. The unlaminated film used in starting up the process is of course removed before the rolls of laminated film are wound. If desired, the film may be cut into sheets instead of being wound in rolls.

In addition to being permanently flat, non-warping and non-shrinking these laminated films may be produced at high speed from films which may have irregularities on the wheel surfaces. By our process the lamination of wheel to wheel surfaces and the inclusion of compositing plasticizers at the interfacial bond smooths out any irregularities which may be due to imperfections in the surface of the casting wheel. It will thus be seen that the fact that the original film had surface irregularities in no way prevents the production of perfect laminated film. Moreover by this method films which would fail to stick to each other by the sole application of heat and pressure, such as cellulose acetate film containing 30 parts of triphenyl phosphate to 100 parts of cellulose ester, are satisfactorily composited with a plasticizer such as dimethyl phthalate which is an active solvent for the cellulose acetate film at elevated temperatures but relatively inactive when cold.

The tear strength of films laminated in accordance with our process is higher and more permanent than that of films of the same thickness which are cast and also higher than films laminated with the use of volatile solvents. Using a standard "Elmendorf" tear tester we have found that whereas a laminated film .01 inch thick laminated with volatile ethyl lactate has a tear strength of 110 grams and a solid single film of the same thickness has a tear strength of 135 to 170 grams, a film of the same thickness laminated with dimethyl phthalate by our process has a tear strength of from 188 to 250 grams. This higher tear strength is maintained even after "ageing" the film for one week at 120° F. Also such a 0.01 inch laminated film shows no tendency to curl during 10 days at 140° F. and 95% relative humidity and shows a shrinkage of only 0.07% after 48 hours at 140° F., whereas a single film of similar thickness will take a transverse curvature of 1–2 inch radius in one day under these conditions and show a shrinkage of 1% or more.

It is to be understood that the foregoing detailed description is given merely by way of illustration and that many variations may be made therein without departing from the spirit of our invention.

Having described our invention, what we desire to secure by Letters Patent is:

1. The method of laminating thermoplastic films, which comprises heating the films to be joined, coating a surface of each of the films with a heated relatively non-volatile plasticizer which is an active solvent when hot, uniting the coated surfaces of the films under heat and pressure, and annealing the resulting laminated film by further exposure to heat and then cooling the laminated film, the whole operation being effected while the films are travelling.

2. The method of laminating cellulose derivative films, which comprises heating the films to be joined, coating a surface of each of the films with a heated relatively non-volatile plasticizer which is an active solvent when hot, uniting the coated surfaces of the films under heat and pressure, and annealing the resulting laminated film by further exposure to heat and then cooling the laminated film, the whole operation being effected while the films are travelling.

3. The method of laminating films of cellulose acetate, which comprises heating the films to be joined, coating a surface of each of the films with a heated relatively non-volatile plasticizer which is an active solvent when hot, uniting the coated surfaces of the films under heat and pressure, and annealing the resulting laminated film by further exposure to heat, the whole operation being effected while the films are travelling.

4. The method of laminating films of cellulose acetate, which comprises heating the films to be joined, coating a surface of each of the films with heated dimethyl phthalate, uniting the coated surfaces of the films under heat and pressure, and annealing the resulting laminated film by further exposure to heat, the whole operation being effected while the films are travelling.

5. The method of laminating films of cellulose acetate, which comprises heating the films to be joined, coating a surface of each of the films with heated dibutyl tartrate, uniting the coated surfaces of the films under heat and pressure, and annealing the resulting laminated film by further exposure to heat, the whole operation being effected while the films are travelling.

6. The method of laminating films of cellulose acetate, which comprises heating the films to be joined, coating a surface of each of the films with heated dimethoxy ethyl phthalate, uniting the coated surfaces of the films under heat and pressure, and annealing the resulting laminated film by further exposure to heat, the whole operation being effected while the films are travelling.

7. The method of laminating films of cellulose acetate, which comprises heating the films to be joined to a temperature of from about 175° F. to 200° F., coating a surface of each of the films with dimethyl phthalate heated to a temperature of from about 125° F. to 200° F., uniting the coated surfaces by subjecting the films to the pressure of rollers heated to temperatures of from about 140° F. to about 200° F. and then annealing the resulting laminated film in a chamber in the presence of air heated to temperatures of from about 175° F. to about 200° F. for a period of time ranging from 1 to about 10 minutes.

BJORN ANDERSEN.
RALPH H. BALL.